US008432910B2

(12) United States Patent
Miyoshi

(10) Patent No.: US 8,432,910 B2
(45) Date of Patent: Apr. 30, 2013

(54) TRANSMISSION INFORMATION TRANSFER APPARATUS AND ITS METHOD

(75) Inventor: Takashi Miyoshi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/274,509

(22) Filed: Nov. 20, 2008

(65) Prior Publication Data

US 2009/0262750 A1 Oct. 22, 2009

(30) Foreign Application Priority Data

Apr. 21, 2008 (JP) ................................ 2008-110003

(51) Int. Cl.
*H04L 12/56* (2006.01)

(52) U.S. Cl.
USPC ..................................... 370/392; 370/395.32

(58) Field of Classification Search .................. 370/389, 370/392, 395.31, 395.32
See application file for complete search history.

(56) References Cited

U.S. PATENT DOCUMENTS

| | | | |
|---|---|---|---|
| 6,115,385 A | 9/2000 | Vig | |
| 6,222,839 B1 | 4/2001 | Nakazaki et al. | |
| 6,308,220 B1 * | 10/2001 | Mathur | 709/238 |
| 6,553,031 B1 * | 4/2003 | Nakamura et al. | 370/392 |
| 6,574,240 B1 | 6/2003 | Tzeng | |
| 6,947,410 B1 | 9/2005 | Schwartz et al. | |
| 7,002,965 B1 * | 2/2006 | Cheriton | 370/395.32 |
| 7,079,537 B1 | 7/2006 | Kanuri et al. | |
| 7,106,740 B1 * | 9/2006 | Leelanivas et al. | 370/392 |
| 7,471,682 B2 * | 12/2008 | Singh et al. | 370/392 |
| 7,652,903 B2 * | 1/2010 | Huang | 365/49.1 |
| 2002/0089989 A1 | 7/2002 | Christensen et al. | |
| 2002/0191628 A1 * | 12/2002 | Liu et al. | 370/428 |
| 2004/0105422 A1 * | 6/2004 | Sahni et al. | 370/351 |
| 2005/0281196 A1 * | 12/2005 | Tornetta et al. | 370/235 |
| 2006/0182118 A1 * | 8/2006 | Lam et al. | 370/395.42 |
| 2007/0047546 A1 * | 3/2007 | Deguchi et al. | 370/390 |
| 2008/0019368 A1 * | 1/2008 | Liu et al. | 370/392 |
| 2009/0172156 A1 * | 7/2009 | Yadav et al. | 709/224 |

FOREIGN PATENT DOCUMENTS

| | | |
|---|---|---|
| JP | 2004-48278 | 2/2004 |
| JP | 2007-68050 | 3/2007 |

OTHER PUBLICATIONS

European Search Report dated Sep. 9, 2009, from the corresponding European Application.
Extended European Search Report mailed Sep. 23, 2011 for corresponding European Application No. EP 11 17 5700.
"Japanese Office Action" mailed by JPO and corresponding to Japanese application No. 2008-110003 on Mar. 27, 2012, with English translation.

* cited by examiner

*Primary Examiner* — Dang Ton
*Assistant Examiner* — Ryan Kavleski
(74) *Attorney, Agent, or Firm* — Fujitsu Patent Center

(57) ABSTRACT

A transmission information transfer apparatus includes: an FDB that manages IP addresses in association with a plurality of respective input/output sections; an IP packet recognition section that determines whether input transmission information includes an IP address indicating the destination of the input transmission information; an FDB reference section and output port determination section that determine, in the case where the input transmission information includes an IP address, whether the IP address included in the input transmission information and predetermined IP address associated with any one of the plurality of input/output sections different from an input/output section coincides with one another; and an output port determination section that sets, in the case where it has been determined that the IP address included in the input transmission information as the destination of the input transmission information and the predetermined IP address coincides with one another, any one of the plurality of input/output sections.

3 Claims, 4 Drawing Sheets

TRANSMISSION INFORMATION TRANSFER APPARATUS AND ITS METHOD

BACKGROUND OF THE INVENTION

1. Field of the Invention

The present invention relates to a packet transfer technique in a network.

2. Description of the Related Art

A Layer 2 Ethernet® switch (hereinafter, referred to as "L2 switch") determines an output port as the destination of an input packet based on a MAC address. To this end, the L2 switch has an FDB (Forwarding Database). The FDB is a database for use in performing a full-width search of output port information using, as a search key, a destination MAC address which is an address indicating the destination of an input packet.

A Layer 3 Ethernet® switch (hereinafter, referred to as "L3 switch") determines an output port as the destination of an input packet based on an IP address which is managed by an upper protocol than one managing the MAC address. In general, the L3 switch has an IP routing table for the processing of determining the output port as an IP address. With reference to FIG. 6, a configuration of the L3 switch will be described. FIG. 6 is a block diagram showing a configuration of a conventional L3 switch.

As shown in FIG. 6, an L3 switch 5 has an input port 51, a packet switching section 52, and an output port 53. The output port 53 is constituted by a plurality of output ports. The input port 51 includes an IP packet recognition section 511. The packet switching section 52 includes an FDB 521, an FDB reference section 522, a routing table reference section 523, a routing table 524, and an output port determination section 523.

The IP packet recognition section 511 determines whether an input packet includes an IP address. In the case where the input packet includes an IP address, the IP packet recognition section 511 passes the input packet to the routing table reference section 523. In the case where the input packet does not include an IP address, i.e., where the input packet includes a MAC address, the IP packet recognition section 511 passes the input packet to the FDB reference section 522. The FDB 521 associates the MAC address with any one of the plurality of output ports 53. The FDB reference section 522 performs a full-width search of the FDB 521 using the MAC address as a search key to thereby output any one of the output ports 53 as data. The routing table 524 associates the IP address with any one of the plurality of output ports 53. The routing table reference section 523 performs a partial match search of the routing table 524 using the IP address as a search key to thereby output any one of the output ports 53 as data. The output port determination section 523 determines the output port 53 output as data by the FDB reference section 522 or routing table reference section 523 as the output destination of a packet input to the input port 51.

As described above, the L3 switch 5 includes, in addition to the FDB 521, the routing table 524 for use in determining the output port 53 using the IP address as a search key. This is the most different point from the configuration of the L2 switch. Further, a common L3 switch 5 utilizes a TCAM (Ternary Content Addressable Memory) for realizing a function (L3 function provided by the routing table reference section 523 and routing table 524) of determining the output port using the IP address as a search key.

Although the L2 switch and L3 switch 5 have different configurations as described above, there is a case where a function of determining the output port based on the IP address is required for a switching hub used mainly as the L2 switch.

As a conventional art relating to the present invention, there is known a packet transfer apparatus in which an IP packet and an L2 packet are transferred by one switch when configuring a VLAN (refer to, e.g., Patent Document 1: Jpn. Pat. Appln. Laid-Open Publication No. 2007-68050).

However, in order to realize a function of determining the output port based on the IP address as a search key by the L2 switch, it is necessary to utilize the TCAM requiring large resources and large power consumption. Further, an overhead may occur when the switching hub used mainly as the L2 switch has the TCAM.

SUMMARY OF THE INVENTION

The present invention has been made to solve the above problem, and an object thereof is to provide a transmission information transfer apparatus and its method capable of realizing a transfer function based on the IP address with less resources.

To solve the above problem, according to an aspect of the present invention, there is provided a transmission information transfer apparatus that uses a plurality of input/output sections to input/output transmission information, comprising: an address management section that manages predetermined IP addresses in association with the plurality of respective input/output sections; a first determination section that determines whether input transmission information which is transmission information input to any one of the plurality of input/output sections includes an IP address indicating the destination of the input transmission information; a second determination section that determines, in the case where it has been determined by the first determination section that the input transmission information includes an IP address indicating the destination of the input transmission information, whether the IP address included in the input transmission information as the destination of the input transmission information and predetermined IP address associated by the address management section with any one of the plurality of input/output sections different from an input/output section to which the input transmission information has been input coincide with one another; and an output destination determination section that sets, in the case where it has been determined by the second determination section that the IP address included in the input transmission information as the destination of the input transmission information and predetermined IP address associated by the address management section with any one of the plurality of input/output sections different from an input/output section to which the input transmission information has been input coincide with one another, any one of the plurality of input/output sections associated by the address management section with the predetermined IP address as the destination of the input transmission information.

Further, according to another aspect of the present invention, there is provided a transmission information transfer method that uses a plurality of input/output sections to input/output transmission information, comprising: an address management step that manages predetermined IP addresses in association with the plurality of respective input/output sections; a first determination step that determines whether input transmission information which is transmission information input to any one of the plurality of input/output sections includes an IP address indicating the destination of the input transmission information; a second determination step that determines, in the case where it has been determined by the first determination step that the input transmission information includes an IP address indicating the destination of the input transmission information, whether the IP address included in the input transmission information as the destination of the input transmission information and predetermined IP address associated by the address management step with any one of the plurality of input/output sections different from an input/output section to which the input transmission information has been input coincide with one another; and an output destination determination step that sets, in the case where it has been determined by the second determination step that the IP address included in the input transmission information as the destination of the input transmission information and predetermined IP address associated by the address management step with any one of the plurality of input/output sections different from an input/output section to which the input transmission information has been input coincide with one another, any one of the plurality of input/output sections associated by the address management step with the predetermined IP address as the destination of the input transmission information.

According to the present invention, it is possible to realize a transfer function based on the IP address with fewer resources.

DETAILED DESCRIPTION OF THE PREFERRED EMBODIMENTS

An embodiment of the present invention will be described below with reference to the accompanying drawings.

Figure 1:
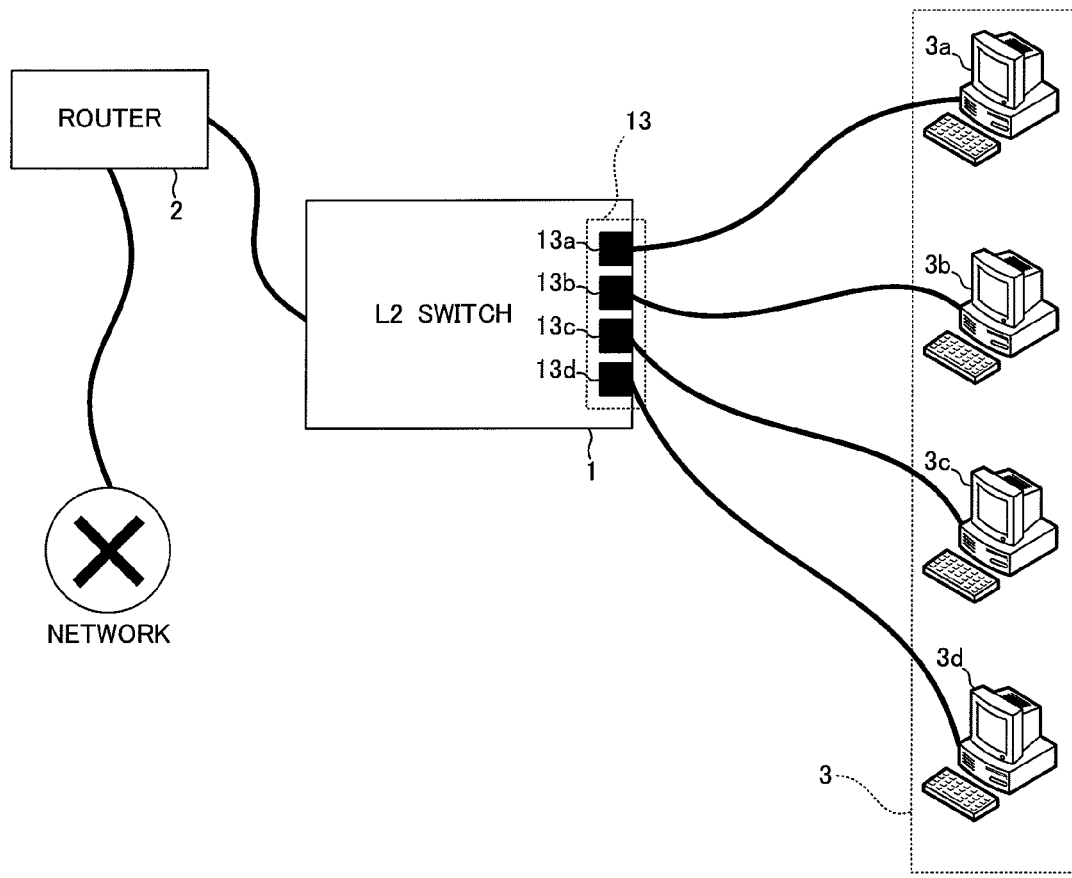
FIG. 1 is a view showing the entire configuration according to an embodiment of the present invention.

The entire configuration of an embodiment of the present invention will be described. FIG. 1 is a view showing the entire configuration of the present embodiment.

The present embodiment is constituted by a router 2 connected to a network, an L2 switch 1 (transmission information transfer apparatus) connected to the router 2, and a personal computer group 3 constituted by a plurality of personal computers 3a to 3d connected to the L2 switch 1. The L2 switch 1 has an output port 13 constituted by a plurality of output ports 13a to 13d, to which the respective personal computers constituting the personal computer group 3 are connected.

Figure 2:
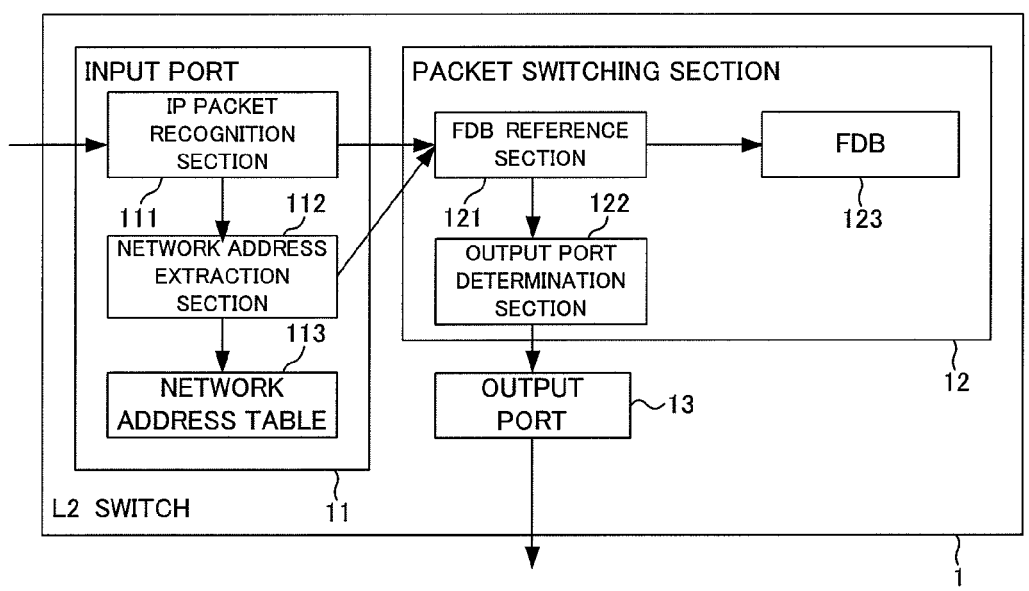
FIG. 2 is a block diagram showing a configuration of an L2 switch.
Figure 3:
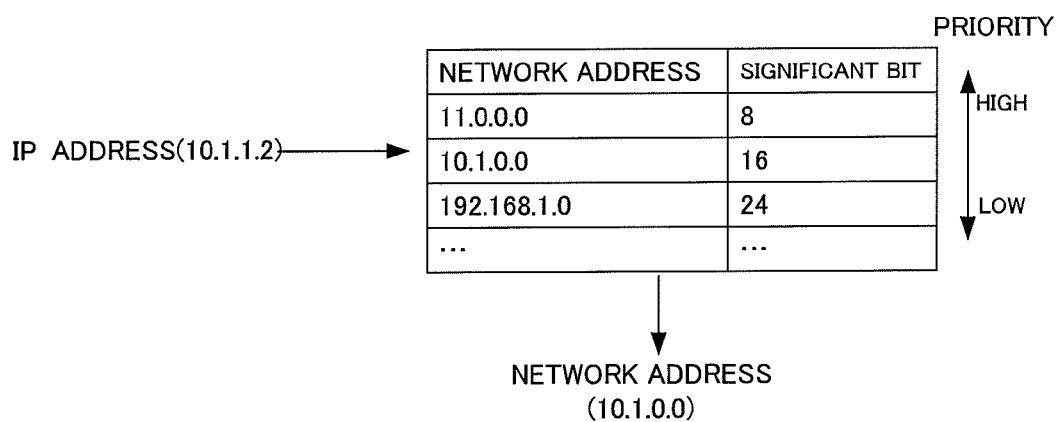
FIG. 3 is a view showing a network address table.
Figure 4:
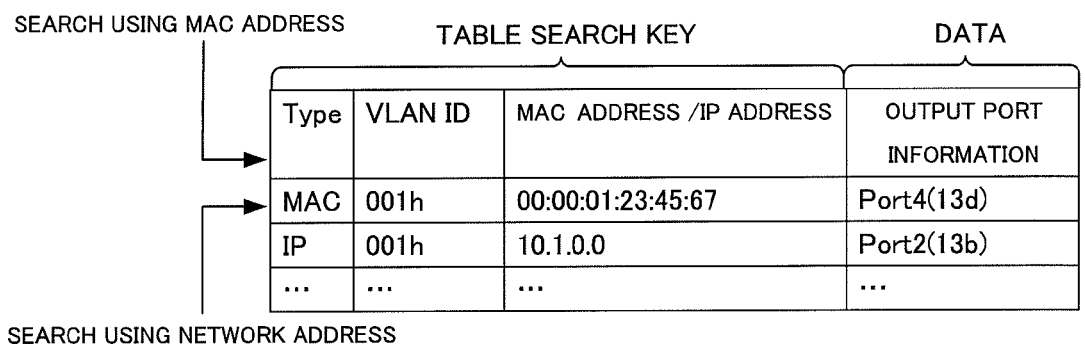
FIG. 4 is a view showing an FDB.

A configuration of the L2 switch according to the present embodiment will be described. FIG. 2 is a block diagram showing a configuration of the L2 switch. FIG. 3 is a view showing a network address table. FIG. 4 is a view showing an FDB.

As shown in FIG. 2, the L2 switch 1 according to the present embodiment has an input port 11 (input/output section), a packet switching section 12, and an output port 13 (input/output section). The input port 11 includes an IP packet recognition section 111 (first determination section), a network address extraction section 112 (network address determination section), and a network address table 113 (network address management section). The packet switching section 12 includes an FDB reference section 121 (second determination section), an output port determination section 122 (second determination section, output destination determination section), and an FDB 123 (address management section).

The IP packet recognition section 111 determines whether a packet identifier (or Ethertype) included in a packet input thereto from the router 2 (hereinafter, referred to merely as "input packet") is an IP packet. When determining that a packet identifier included in the input packet is an IP packet, the IP packet recognition section 111 extracts the IP address from the IP packet. The network address table 113 is, as shown in FIG. 3, a table storing a network address and a significant bit (or subnet mask) in association with one another. A value of any type may be used to represent the significant bit as long as it can define a network range. The network address extraction section 112 refers to the network address table 113 to thereby extract a network address based on the IP address. Priority is assigned to respective network addresses stored in the network address table 113 in the form of the significant bit associated respectively with the network addresses. The smaller the value of the significant bit, i.e., the wider the range of a network indicated by the network address, the higher the priority becomes. The network address extraction section 112 performs matching between the network addresses and IP address included in the input packet in the descending order in terms of the priority assigned to the network addresses. With this processing, the L2 switch 1 can obtain a network address covering a wider range, thereby reducing processing load involved in search processing that the FDB reference section 121 to be described later performs using the network address as a search key. That is, the grouping of the IP addresses can reduce the number of network addresses to be searched for.

Although a description has been made assuming that a port to which the packet is input is the input port 11 and that a port from which the packet is output is the output port 13 for the sake of simplicity, the input port 11 and output port 13 are ports that can be used for input and output.

As shown in FIG. 4, the FDB 123 stores an address type (Type), a VLAN (Virtual LAN) ID, and an address (MAC address/IP address) which serve as search keys in the matching and output port information which serves as data in the matching in association with one another. The Type indicates a MAC address or IP address. The VLAN ID is an ID for identifying the VLAN. In the present embodiment, the VLAN IDs of all the output ports constituting the output port 13 are set to the same VLAN ID (001h). The output port information indicates any one of the output ports 13a to 13d constituting the output port 13. The FDB reference section 121 searches the FDB 123 using the Type, VLAN ID, and address as search keys to acquire the output port information as data. The output port determination section 122 determines any one of the output ports constituting the output port 13 as the output destination of the input packet based on the output port information acquired as data by the FDB reference section 121. The MAC address or IP address registered in the FDB 123 is an entry that is dynamically created based on a transmission source MAC address or transmission source IP address and information concerning a receiving port which are included in the input packet.

Figure 5:
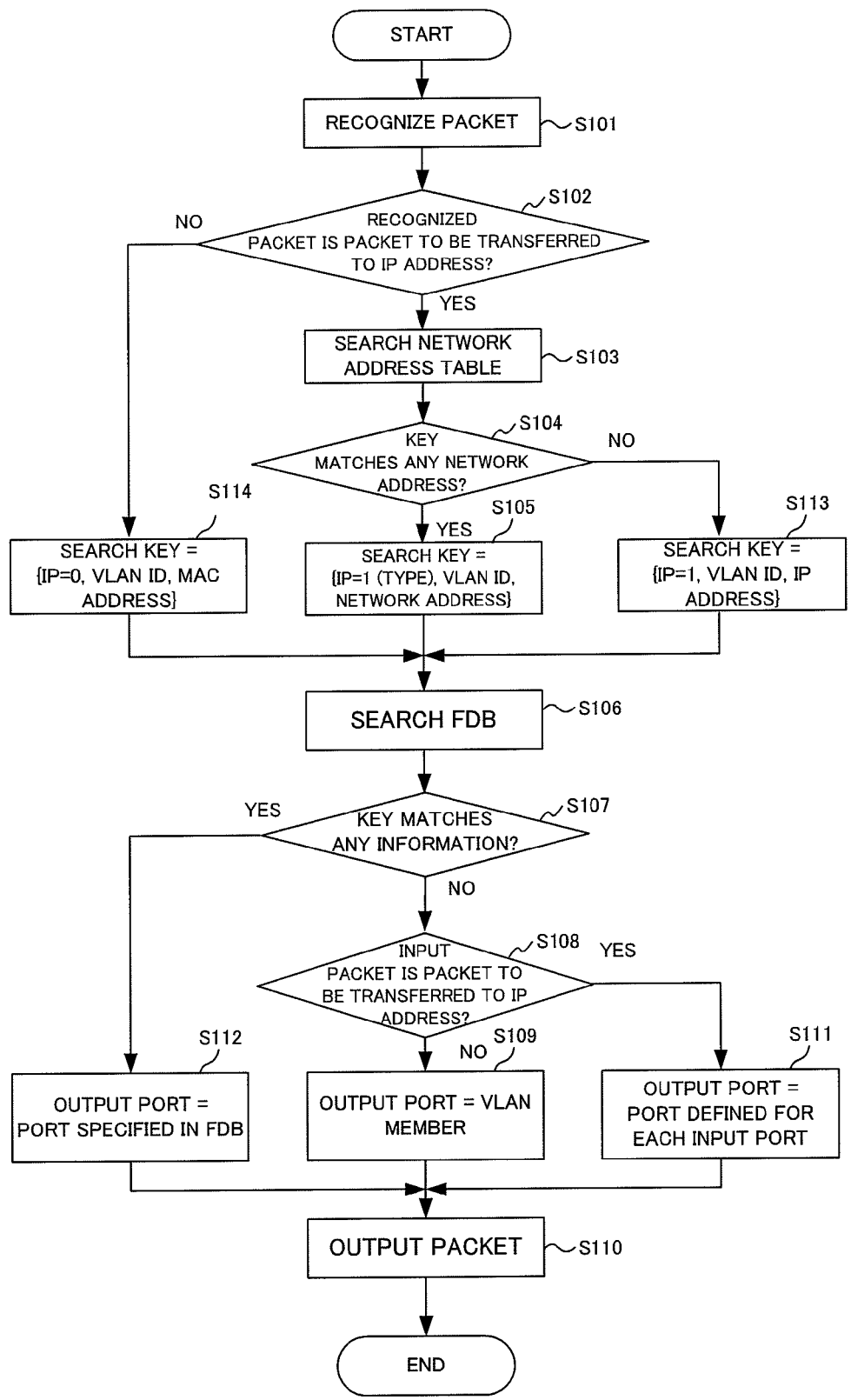
FIG. 5 is a flowchart showing operation of the L2 switch according to the present embodiment.
Figure 6:
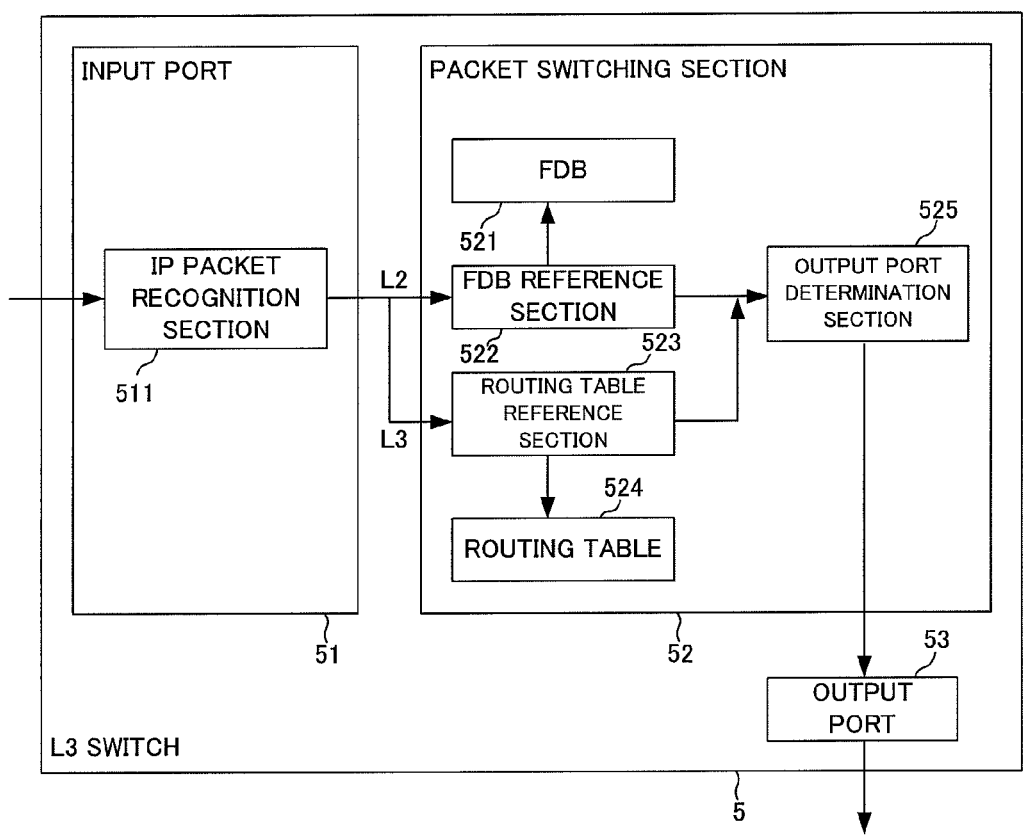
FIG. 6 is a block diagram showing a configuration of a conventional L3 switch.

Next, operation of the L2 switch according to the present embodiment will be described. FIG. 5 is a flowchart showing operation of the L2 switch according to the present embodiment. It is assumed here that the MAC address or IP address and output port are associated with one another in the FDB 123 (address management step). Further, in FIG. 5, it is assumed that the network address and significant bit have already been associated with one another in the network address table 113 (network address management step).

The IP packet recognition section 111 recognizes the input packet (S101) and determines whether the input packet is a packet to be transferred to an IP address, that is, whether the recognized input packet is an IP packet including an IP address as its destination (S102, first determination step).

In the case where the input packet is a packet to be transferred to an IP address (YES in S102), the network address extraction section 112 performs a partial match search of the network address table using an IP address which is the destination address included in the input packet as a search key (S103, network address determination step) to thereby determine whether the key matches any network address, that is, whether there is any network address that matches the IP address (S104, network address determination step).

In the case where the key matches any network address (YES in S104), the FDB reference section 121 sets {IP=1 (Type), VLAN ID, network address} as search keys (S105, second determination step) and performs a full-width search of the FDB 123 (S106, second determination step). "IP=1" means that the address used is an IP address. "IP=0" means that the address used is a MAC address. The FDB reference section 121 may further use the input port number as a search key.

When the FDB reference section 121 performs the search, the output port determination section 122 determines whether the key matches given information, that is, whether there is any information that matches the key in the FDB (S107, second determination step).

In the case where the key does not match any information (NO in S107), the output port determination section 122 determines whether the input packet is a packet to be transferred to an IP address, that is, whether the input packet includes an IP address as its destination (S108).

In the case where the packet is not a packet to be transferred to an IP address (NO in S108), the output port determination section 122 sets the output port 13 to which the input packet is to be output to a VLAN member (S109) and outputs the input packet to all the output ports constituting the output port 13 as broadcast packets (S110).

On the other hand, in the case where the packet is a packet to be transferred to an IP address (YES in S108), the output port determination section 122 sets the output port 13 to which the input packet is to be output to an output port 13 (e.g., default gateway) defined for each input port (S111) and outputs the input packet to the set output port 13.

In the case where the key matches any information (YES in S107), the output port determination section 122 sets the output port 13 to which the input packet is to be output to an output port (output information) specified in the FDB 123 (S112, output destination determination step) and outputs the input packet to the set output port 13 (S110).

In the case where the key does not match any network address (NO in S104), the FDB reference section 121 sets {IP=1, VLAN ID, network address} as search keys (S113, second determination step) and performs a full-width search of the FDB 123 (S106, second determination step).

In the case where the input packet is not a packet to be transferred to an IP address (NO in S102), the FDB reference section 121 sets {IP=1, MAC address} as search keys (S114) and performs a full-width search of the FDB 123 (S106).

As described above, by independently providing the network address extraction function which requires a partial match search, the FDB for a full-width search can be made available for IP forwarding. Further, by replacing a routing table used in an L3 switch with the network address table having a small capacity and FDB which has been provided in a conventional L2 switch, it is possible to reduce the circuit scale required in the switching operation based on the IP address. Further, in the case where a 2 k entry IP address is handled, a CAM of 32 bit key-48 bit-2048 word is required for IP routing in a conventional method, while in the present invention, only by providing a network address table 113 of 32×N (number of subnet masks supported) bit F/F, it is possible to realize IP forwarding handling a 2K entry IP address.

The present invention can be embodied in various forms, without departing from the spirit or the main feature. Therefore, the aforementioned embodiments are merely illustrative of the invention in every aspect, and not limitative of the same. The scope of the present invention is defined by the appended claims, and is not restricted by the description herein set forth. Further, various changes and modifications to be made within the scope of the appended claims and equivalents thereof are to fall within the scope of the present invention.

What is claimed is:

1. A packet transfer apparatus comprising:
a first table including network addresses, each of the network addresses being arranged according to a priority which is indicated by a subnet-mask of a destination IP address;
a second table including type information, virtual LAN identification information, address information and output port information, for each entry, the type information indicating a type of a MAC address or an IP address, the virtual LAN identification information identifying an Virtual LAN, the address information including a MAC address or an IP address, the output port information indicating an output port;
a first determination section to search for a network address matching a network address of a destination IP address, when included in an input packet, by referring to the first table;
a second determination section to perform a full-width search of the second table, after the first determination section searches for the network address, using the type information, the virtual LAN identification information and the network address as search keys so as to determine an output port corresponding to the network address; and
when the destination IP address is not included in the input packet, the second determination performs a full-width search of the second table using the type information, the virtual LAN identification information and a MAC address included in the input packet as search keys so as to determine an output port corresponding to the MAC address.

2. A packet transfer method comprising:
searching a network address matching a network address of a destination IP address, when included in an input packet, by referring to a first table including network addresses, each of the network addresses being arranged according to a priority which is indicated by a subnet-mask of the destination IP address;
after searching the network address in the first table, performing a full-width search of a second table so as to determine an output port corresponding to the network address, the second table including type information, virtual LAN identification information, address information and output port information, for each entry, the type information indicating a type of a MAC address or an IP address, the virtual LAN identification information identifying an Virtual LAN, the address information including a MAC address or an IP address, the output port information indicating an output port, the full-width search being performed using the type information, the virtual LAN identification information and the network address as search keys; and performing, when the destination IP address is not included in the input packet, a full-width search of the second table using the type information, the virtual LAN identification information and a MAC address included in the input packet as search keys so as to determine an output port corresponding to the MAC address.

3. A packet transfer apparatus comprising:

a first table including network addresses, each of the network addresses being arranged according to a priority which is indicated by a subnet-mask of the destination IP address;

a second table including type information, virtual LAN identification information, address information and output port information, for each entry, the type information indicating a type of a MAC address or an IP address, the virtual LAN identification information identifying an Virtual LAN, the address information including a MAC address or an IP address, the output port information indicating an output port; and a switch section to search a network address matching a network address of a destination IP address, when included in an input packet, by referring to the first table, and to perform a full-width search of the second table after searching the first table using the type information, the virtual LAN identification information and the network address as search keys so as to determine an output port corresponding to the network address, when the destination IP address is not included in the input packet, the switch section performs a full-width search of the second table using the type information, virtual LAN identification information, and a MAC address included in the input packet as search keys so as to determine an output port corresponding to the MAC address.

* * * * *